US012142841B2

(12) United States Patent
Wang et al.

(10) Patent No.: US 12,142,841 B2
(45) **Date of Patent: *Nov. 12, 2024**

(54) ANTENNA ASSEMBLY HAVING A MONOPOLE ANTENNA AND A CIRCULARLY POLARIZED ANTENNA

(71) Applicant: KYOCERA AVX Components (San Diego), Inc., San Diego, CA (US)

(72) Inventors: Zhe Wang, San Diego, CA (US); Sebastian Rowson, San Diego, CA (US); Nicholas Baird, Lakeside, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,413

(22) Filed: Jan. 30, 2023

(65) Prior Publication Data

US 2023/0170629 A1 Jun. 1, 2023

Related U.S. Application Data

(63) Continuation of application No. 17/681,146, filed on Feb. 25, 2022, now Pat. No. 11,569,588.

(Continued)

(51) Int. Cl.
*H01Q 1/22* (2006.01)
*H01Q 5/42* (2015.01)

(Continued)

(52) U.S. Cl.
CPC ........... *H01Q 21/28* (2013.01); *H01Q 1/2291* (2013.01); *H01Q 5/42* (2015.01); *H01Q 21/20* (2013.01)

(58) Field of Classification Search
CPC ........ H01Q 21/28; H01Q 1/2291; H01Q 5/42; H01Q 21/20; H01Q 3/36; H01Q 5/40; H01Q 7/00; H01Q 21/24; H01Q 9/30
See application file for complete search history.

(56) References Cited

U.S. PATENT DOCUMENTS

| | | | | |
|---|---|---|---|---|
| 4,479,127 | A | 10/1984 | Barbano | |
| 4,933,680 | A | 6/1990 | Shapiro et al. | |
| 5,173,711 | A | 12/1992 | Takeuchi et al. | |
| 6,181,286 | B1 * | 1/2001 | Roscoe | H01Q 21/28 343/702 |
| 6,486,853 | B2 | 11/2002 | Yoshinomoto et al. | |
| 6,919,859 | B2 | 7/2005 | McCarthy et al. | |
| 8,390,526 | B1 | 3/2013 | O'Connell et al. | |

(Continued)

FOREIGN PATENT DOCUMENTS

WO WO 01/33666 5/2001

OTHER PUBLICATIONS

International Search Report and Written Opinion for Application No. PCT/US2022/017814, mailed Jun. 3, 2022, 15 pages.

*Primary Examiner* — Hai V Tran
*Assistant Examiner* — Michael M Bouizza
(74) *Attorney, Agent, or Firm* — Dority & Manning, P.A.

(57) ABSTRACT

An antenna assembly includes a column substrate having a plurality of sides. The column substrate defines a cavity extending from a first end of the column substrate to a second end of the column substrate. The antenna assembly includes a monopole antenna disposed within the cavity. The monopole antenna is configured to communicate over a first frequency band ranging from about 5000 Megahertz to about 5900 Megahertz. The antenna assembly includes a circularly polarized antenna. The circularly polarized antenna includes a plurality of isolated magnetic dipole elements. Each of the isolated magnetic dipole elements is coupled to a different side of the column substrate. The circularly polarized antenna is configured to communicate over a second frequency band and a third frequency band. The second frequency band ranges from about 1560 Megahertz to about 1620 Megahertz. The third frequency band (Continued)

ranges from about 2400 Megahertz to about 2500 Megahertz.

20 Claims, 16 Drawing Sheets

Related U.S. Application Data

(60) Provisional application No. 63/154,107, filed on Feb. 26, 2021.

(51) Int. Cl.
*H01Q 21/20* (2006.01)
*H01Q 21/28* (2006.01)

(56) References Cited

U.S. PATENT DOCUMENTS

| | | | | |
|---|---|---|---|---|
| 9,608,326 | B2 | 3/2017 | Singh et al. | |
| 2002/0018026 | A1* | 2/2002 | Noro | H01Q 5/40 343/729 |
| 2010/0177014 | A1 | 7/2010 | Min et al. | |
| 2014/0139384 | A1 | 5/2014 | Elliot et al. | |
| 2014/0145890 | A1* | 5/2014 | Ramberg | H01Q 9/28 343/726 |
| 2015/0311600 | A1 | 10/2015 | Singh et al. | |
| 2017/0346194 | A1* | 11/2017 | Chamberland | H01Q 9/30 |
| 2018/0034166 | A1* | 2/2018 | Hinman | H01Q 21/28 |

* cited by examiner

ANTENNA ASSEMBLY HAVING A MONOPOLE ANTENNA AND A CIRCULARLY POLARIZED ANTENNA

PRIORITY CLAIM

The present application is a continuation of U.S. Non-Provisional application Ser. No. 17/681,146, titled "Antenna Assembly Having a Monopole Antenna and a Circularly Polarized Antenna" and having a filing date of Feb. 25, 2022, which claims the benefit of priority of U.S. Provisional App. No. 63/154,107, titled "Antenna Assembly Having a Monopole Antenna and a Circularly Polarized Antenna" and having a filing date of Feb. 26, 2021, which is incorporated by reference herein.

FIELD

The present disclosure relates generally to antenna assemblies and, more particularly, to an antenna assembly having a monopole antenna for 5G communications and a circularly polarized antenna for global positioning system (GPS) and/or Wifi communications.

BACKGROUND

Antenna assemblies can include a circularly polarized antenna. The circularly polarized antenna can include a plurality of isolated magnetic dipole elements. Each of the plurality of isolated magnetic dipole elements can be coupled to a radio frequency (RF) phase shifter circuit. In this manner, a RF signal the RF phase shifter circuit provides to one isolated magnetic dipole element of the circularly polarized antenna can be out-of-phase relative to a RF signal provided to every other isolated magnetic dipole element of the circularly polarized antenna.

SUMMARY

Aspects and advantages of embodiments of the present disclosure will be set forth in part in the following description, or may be learned from the description, or may be learned through practice of the embodiments.

In one aspect, an antenna assembly is provided. The antenna assembly includes a column substrate having a plurality of sides. The column substrate defines a cavity extending from a first end of the column substrate to a second end of the column substrate. The antenna assembly further includes a monopole antenna disposed within the cavity. The monopole antenna is configured to communicate over a first frequency band ranging from about 5000 Megahertz to about 5900 Megahertz. The antenna assembly even further includes a circularly polarized antenna. The circularly polarized antenna includes a plurality of isolated magnetic dipole elements. Each of the isolated magnetic dipole elements is coupled to a different side of the column substrate. The circularly polarized antenna is configured to communicate over a second frequency band and a third frequency band. The second frequency band ranges from about 1560 Megahertz to about 1620 Megahertz. The third frequency band ranges from about 2400 Megahertz to about 2500 Megahertz.

In another aspect, an antenna system is provided. The antenna system includes a phase shifter circuit. The phase shifter circuit includes a plurality of phase shifters. Each of the plurality of phase shifters is electrically coupled to a radio frequency source. The antenna system further includes an antenna assembly. The antenna assembly includes a column substrate having a plurality of sides. The column substrate defines a cavity extending from a first end of the column substrate to a second end of the column substrate. The antenna assembly further includes a monopole antenna disposed within the cavity. The monopole antenna is configured to communicate over a first frequency band ranging from about 5000 Megahertz to about 5900 Megahertz. The antenna assembly even further includes a circularly polarized antenna electrically coupled to the phase shifter circuit. The circularly polarized antenna includes a plurality of isolated magnetic dipole elements. Each of the isolated magnetic dipole elements is coupled to a different side of the column substrate. The circularly polarized antenna is configured to communicate over a second frequency band and a third frequency band. The second frequency band ranges from about 1560 Megahertz to about 1620 Megahertz. The third frequency band ranges from about 2400 Megahertz to about 2500 Megahertz.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
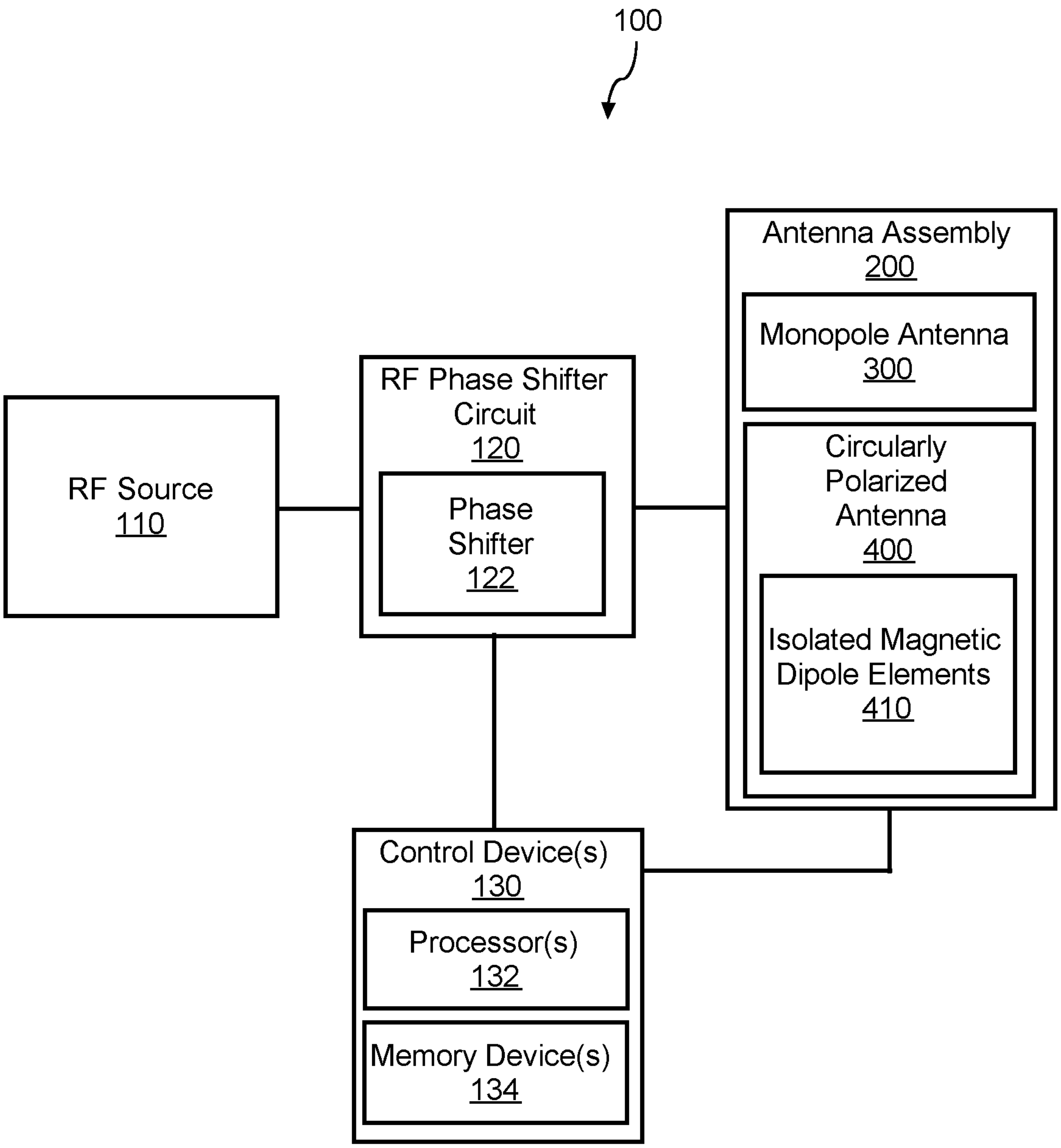
FIG. 1 depicts an antenna system according to example embodiments of the present disclosure.

Reference now will be made in detail to embodiments, one or more examples of which are illustrated in the drawings. Each example is provided by way of explanation of the embodiments, not a limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna assembly. The antenna assembly can include a column substrate having a plurality of sides. For instance, in some implementations, the column substrate can include four sides. In alternative implementations, the column substrate can include more or fewer sides. The antenna assembly can further include a circularly polarized antenna. Details of the circularly polarized antenna will now be discussed in more detail.

The circularly polarized antenna can be configured to communicate over a first frequency band associated with GPS communications and a second frequency band associated with Wifi communications. The first frequency band can range from about 1560 Megahertz to about 1620 Megahertz. The second frequency band can range from about 2400 Megahertz to about 2500 Megahertz. As used herein, use of the term "about" with reference to a numerical value refers to a range of values within 10% of the stated numerical value.

In some implementations, the circularly polarized antenna can include a plurality of isolated magnetic dipole elements. Each of the plurality of isolated magnetic dipole elements can be coupled to a different side of the of the column substrate. For instance, a first isolated magnetic dipole element can be disposed on a first antenna plate (e.g., antenna printed circuit board) that is coupled to a first side of the column substrate. A second isolated magnetic dipole element can be disposed on a second antenna plate that is coupled to a second side of the column substrate. A third isolated magnetic dipole element can be disposed on a third antenna plate that is coupled to a third side of the column substrate. A fourth isolated magnetic dipole element can be disposed on a fourth antenna plate that is coupled to a fourth side of the column substrate.

Each of the isolated magnetic dipole elements of the circularly polarized antenna can be coupled to a RF phase shifter circuit. For instance, the RF phase shifter circuit can provide a first RF signal to the isolated magnetic dipole element disposed on a first side of the column substrate a second RF signal to the isolated magnetic dipole element disposed on a second side of the column substrate, a third RF signal to the isolated magnetic dipole element disposed on a third side of the column substrate, and a fourth RF signal disposed on a fourth side of the column substrate. The second RF signal can be 90 degrees out-of-phase relative to the first RF signal. The third RF signal can be 180 degrees out-of-phase relative to the first RF signal. The fourth RF signal can be 270 degrees out-of-phase relative to the first RF signal. In this manner, the plurality of isolated magnetic dipole elements disposed on the column substrate can collectively form a circularly polarized antenna.

The antenna assembly can include a monopole antenna. The monopole antenna can be configured to communicate over a frequency band associated with 5G communications. For instance, the frequency band can range from about 5000 Megahertz to about 5900 Megahertz. The monopole antenna can be disposed within a cavity defined by the column substrate. In this manner, the monopole antenna can be incorporated into the antenna assembly without requiring additional components.

The antenna system according to example aspects of the present disclosure can provide numerous technical effects and benefits. For instance, the monopole antenna of the antenna assembly can facilitate communications on a 5G network. Furthermore, since the monopole antenna is disposed within a cavity defined by the column substrate configured to accommodate the circularly polarized antenna of the antenna assembly, the monopole antenna can be incorporated into the antenna assembly without increasing a footprint of the antenna assembly.

Referring now to the FIGS., FIG. 1 depicts an antenna system 100 according to example embodiments of the present disclosure. As shown, the antenna system 100 includes an antenna assembly 200 electrically coupled to a RF source 110. For instance, in some implementations, the antenna assembly 200 can be electrically coupled to the RF source 110 via a cable (e.g., coaxial cable). In this manner, a RF signal generated by the RF source 110 can be provided to the antenna assembly 200 via the cable 112.

As shown, the antenna assembly 200 can include a monopole antenna 300. The monopole antenna 300 can be configured to communicate over a first frequency band associated with 5G communications. For instance, in some implementations, the first frequency band can range from about 5000 Megahertz to about 5900 Megahertz. In this manner, the monopole antenna 300 of the antenna assembly 200 can facilitate communications with one or more devices on a 5G communications network.

As shown, the antenna assembly 200 can include a circularly polarized antenna 400. In some implementations, the circularly polarized antenna 400 can include a plurality of isolated magnetic dipole elements 410. For instance, in some implementations, the circularly polarized antenna 400 can include four isolated magnetic dipole elements. In alternative implementations, the circularly polarized antenna 400 can include more or fewer isolated magnetic dipole elements 410.

The circularly polarized antenna 400 can be configured to communicate over a second frequency band and a third frequency band that is different (e.g., does not overlap) than the second frequency band. In some implementations, the second frequency band can range from about 1560 Megahertz to about 1620 Megahertz. Alternatively, or additionally, the third frequency band can range from about 2400 Megahertz to about 2500 Megahertz. In some implementations, the circularly polarized antenna 400 can have a radiation pattern that is right-hand circularly polarized. In alternative implementations, the circularly polarized antenna 400 can have a radiation pattern that is left-hand circularly polarized.

In some implementations, the antenna system 100 can include a RF phase shifter circuit 120 electrically coupled between the RF source 110 and the circularly polarized antenna 400 of the antenna assembly 200. The RF phase shifter circuit 120 can include a plurality of phase shifters 122. Each of the phase shifters 122 can be electrically coupled between the RF source 110 and a corresponding isolated magnetic dipole element of the plurality of isolated magnetic dipole elements 410. In this manner, each of the phase shifters 122 can receive a RF signal from the RF source 110. It should be understood that each of the phase shifters 122 can be configured to control a phase shift of the RF signal received from the RF source 110.

The antenna system 100 can include one or more control devices 130. The one or more control devices 130 can be communicatively coupled to the antenna assembly 200. In this manner, the one or more control devices 130 can be configured to control the circularly polarized antenna 400 of the antenna assembly 200 to steer a radiation pattern associated with the circularly polarized antenna 400 along at least one of an azimuth plane or an elevation plane.

Furthermore, in some implementations, the one or more control devices 130 can be communicatively coupled to the RF phase shifter circuit 120. In this manner, the one or more control devices 130 can be configured to control the phase shifters 122 thereof to steer the radiation pattern of the circularly polarized antenna 400 along at least one of the azimuth plane or the elevation plane.

As shown, the one or more control devices 130 can include one or more processors 132 and one or more memory devices 134. The one or more processors 132 can include any suitable processing device, such as a microprocessor, microcontroller, integrated circuit, logic device, or other suitable processing device. The one or more memory devices 134 can include one or more computer-readable media, including, but not limited to, non-transitory computer-readable media, RAM, ROM, hard drives, flash drives, or other memory devices.

The one or more memory devices 134 can store information accessible by the one or more processors 132, including computer-readable instructions that can be executed by the one or more processors 132. The computer-readable instructions can be any set of instructions that, when executed by the one or more processors 132, cause the one or more processors 132 to perform operations. The computer-readable instructions can be software written in any suitable programming language or may be implemented in hardware. In some implementations, the computer-readable instructions can be executed by the one or more processors to cause the one or more processors to perform operations, such as controlling operation of the antenna assembly 200. Additionally, the operations can include controlling one or more phase shifters 122 of the RF phase shifter circuit 120.

Figure 2:
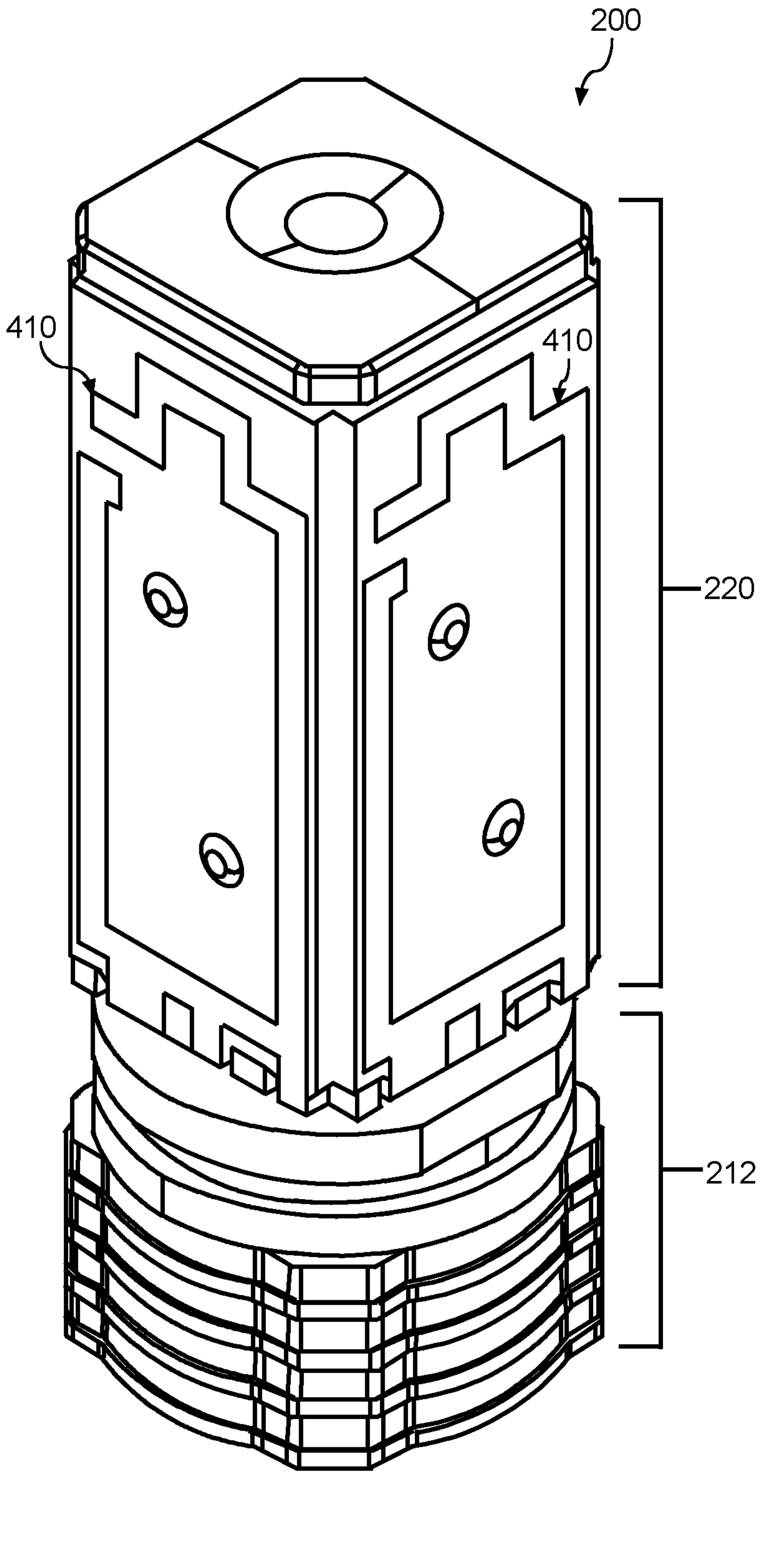
FIG. 2 depicts an antenna assembly according to example embodiments of the present disclosure.
Figure 3:
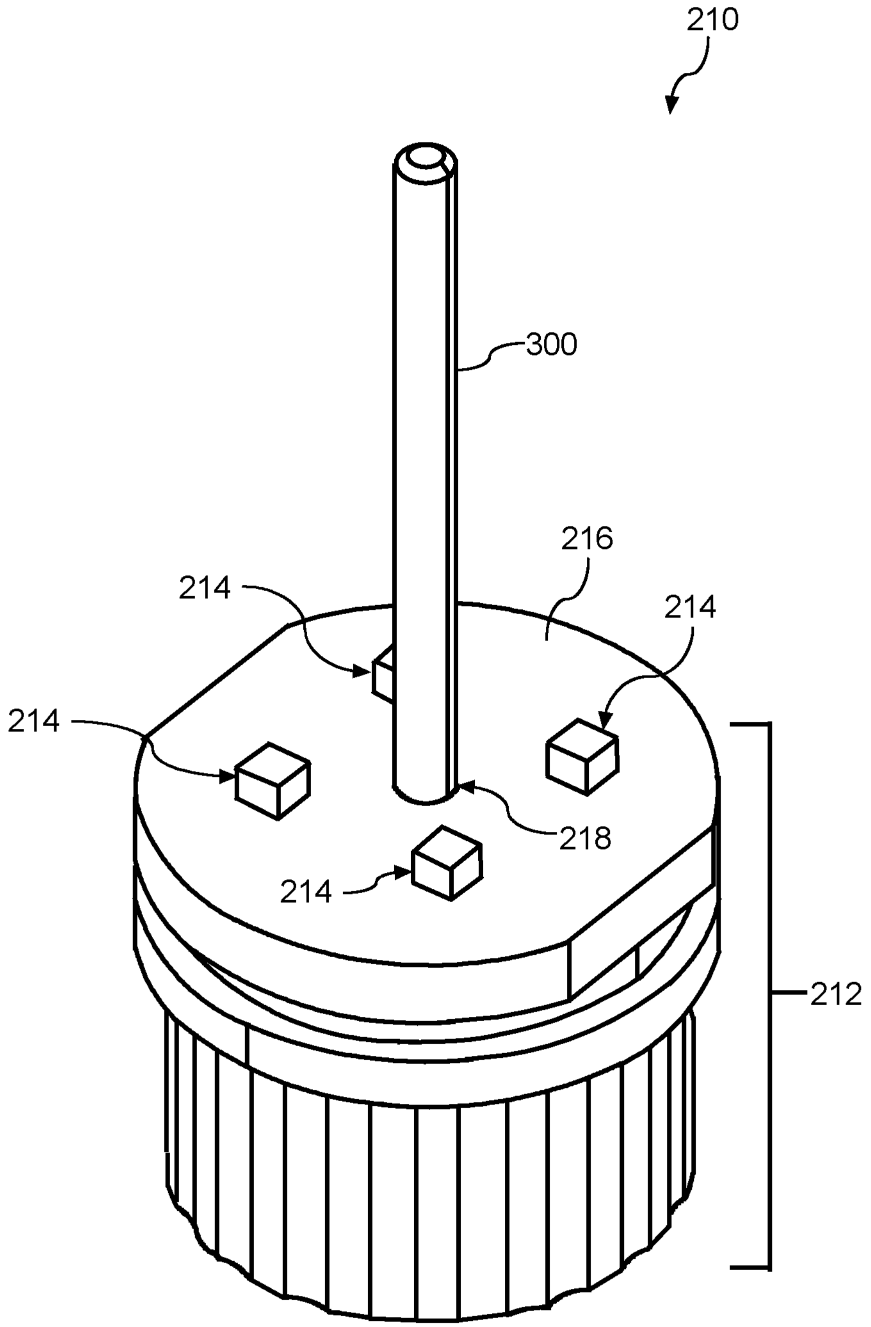
FIG. 3 depicts a lower portion of an antenna assembly according to example embodiments of the present disclosure.
Figure 4:
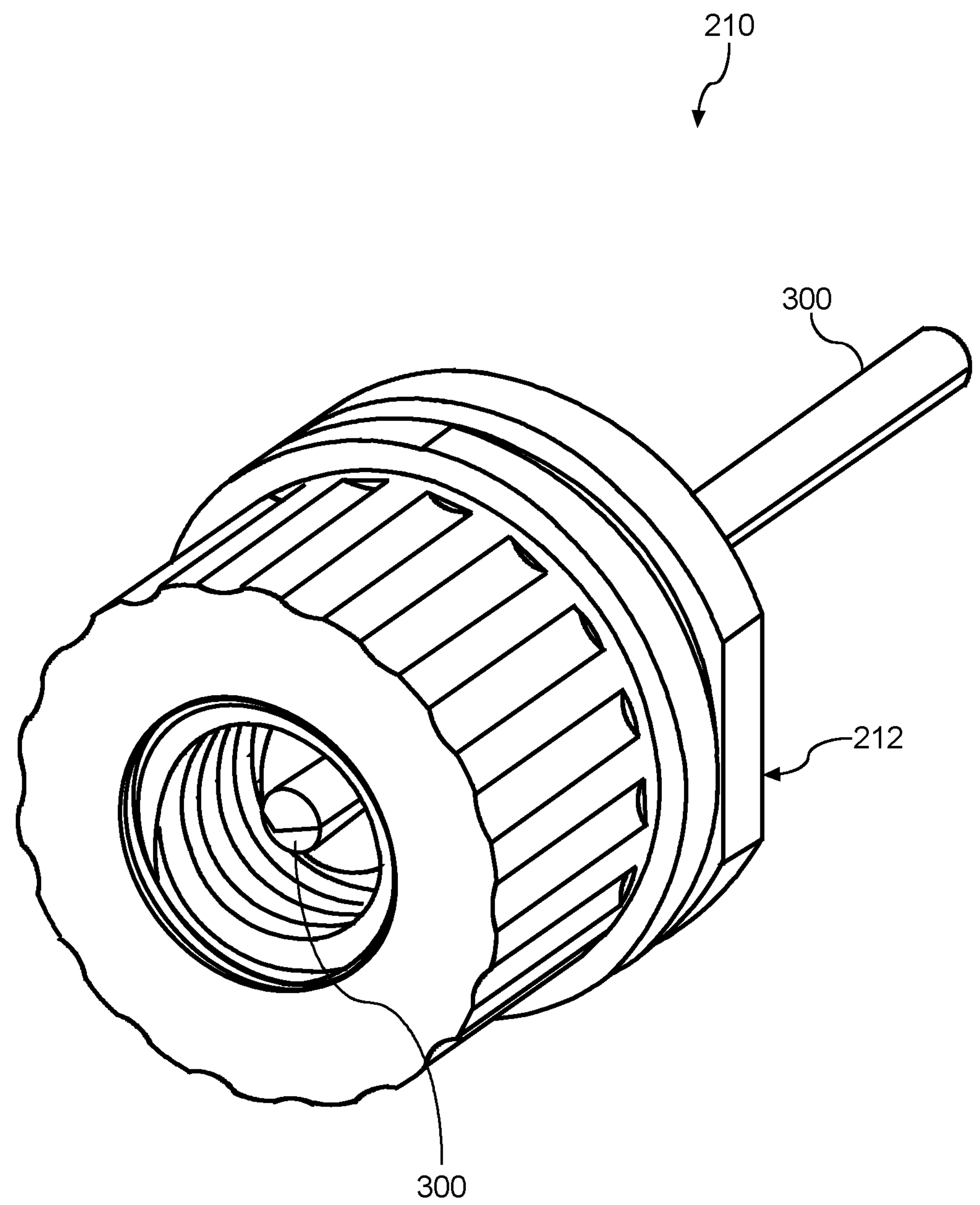
FIG. 4 depicts a bottom view of the lower portion depicted in FIG. 3 according to example embodiments of the present disclosure.

Referring now to FIG. 2 through 4, the antenna assembly 200 can include a first portion 210 (e.g., lower portion) and a second portion 220 (e.g., upper portion) that is removably coupled to the first portion 210. The first portion 210 can include the monopole antenna 300 (FIG. 1). The second portion 220 can include the circularly polarized antenna 400 (FIG. 1).

As shown, the first portion 210 can include a base 212. The base 212 can include a plurality of projections 214. In particular, each of the plurality of projections 214 can extend from a surface 216 of the base 212. Furthermore, the base 212 can define an aperture 218. As shown, the monopole antenna 300 can pass through the aperture 218.

In some implementations, the base 212 can include an electrical connector. For instance, the base 212 can include a coaxial radio frequency (RF) connector. In some implementations, the coaxial RF connector can include a SubMiniature version A connector. It should be understood that the base can include any suitable type of coaxial RF connector. In this manner, the base 212 can be electrically coupled to the RF source 110 (FIG. 1) via a cable (e.g., RF cable).

Figure 5:
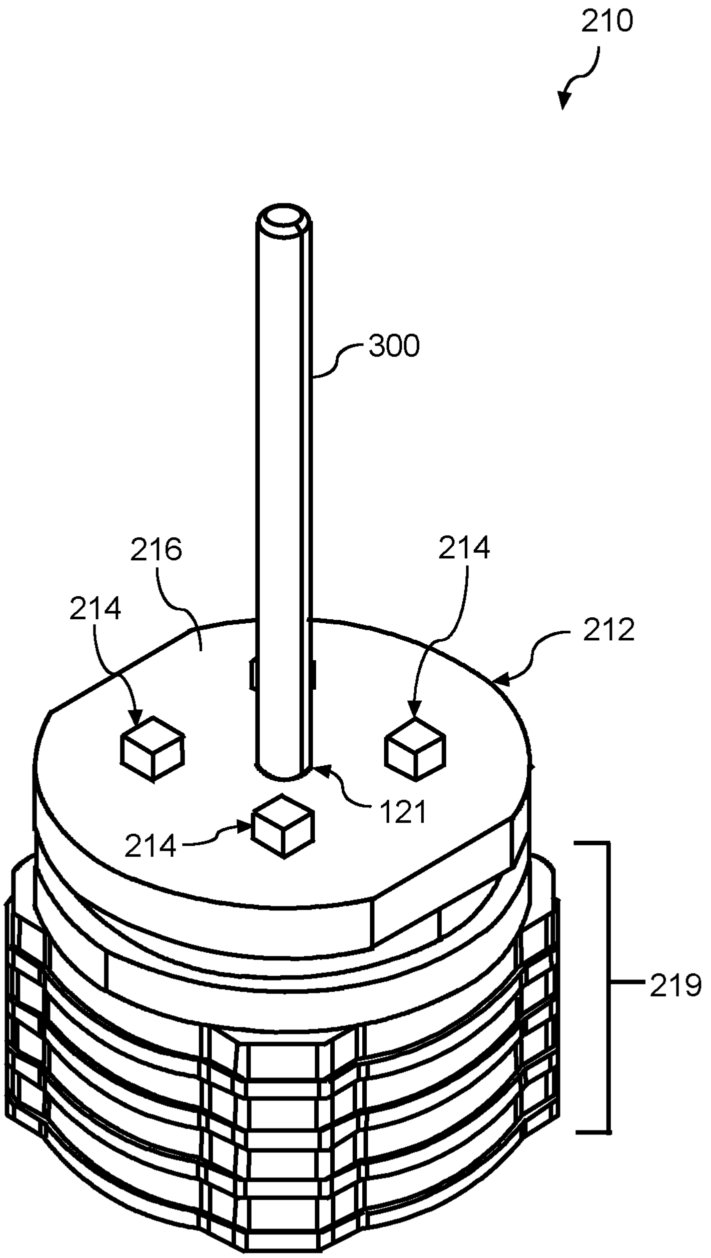
FIG. 5 depicts a lower portion of an antenna assembly according to example embodiments of the present disclosure.

Referring now to FIG. 5, the lower portion 210 of the antenna assembly 200 (FIG. 2) can, in some implementations, include a plurality of fasteners 219 (e.g., washers). As shown, each of the plurality of fasteners 219 can be coupled to the base 212 of the lower portion 210. In some implementations, the lower portion 210 of the antenna assembly 200 can include four separate fasteners 219 (e.g., washers). In alternative implementations, the lower portion 210 of the antenna assembly 200 can include more or fewer fasteners 219.

Figure 6:
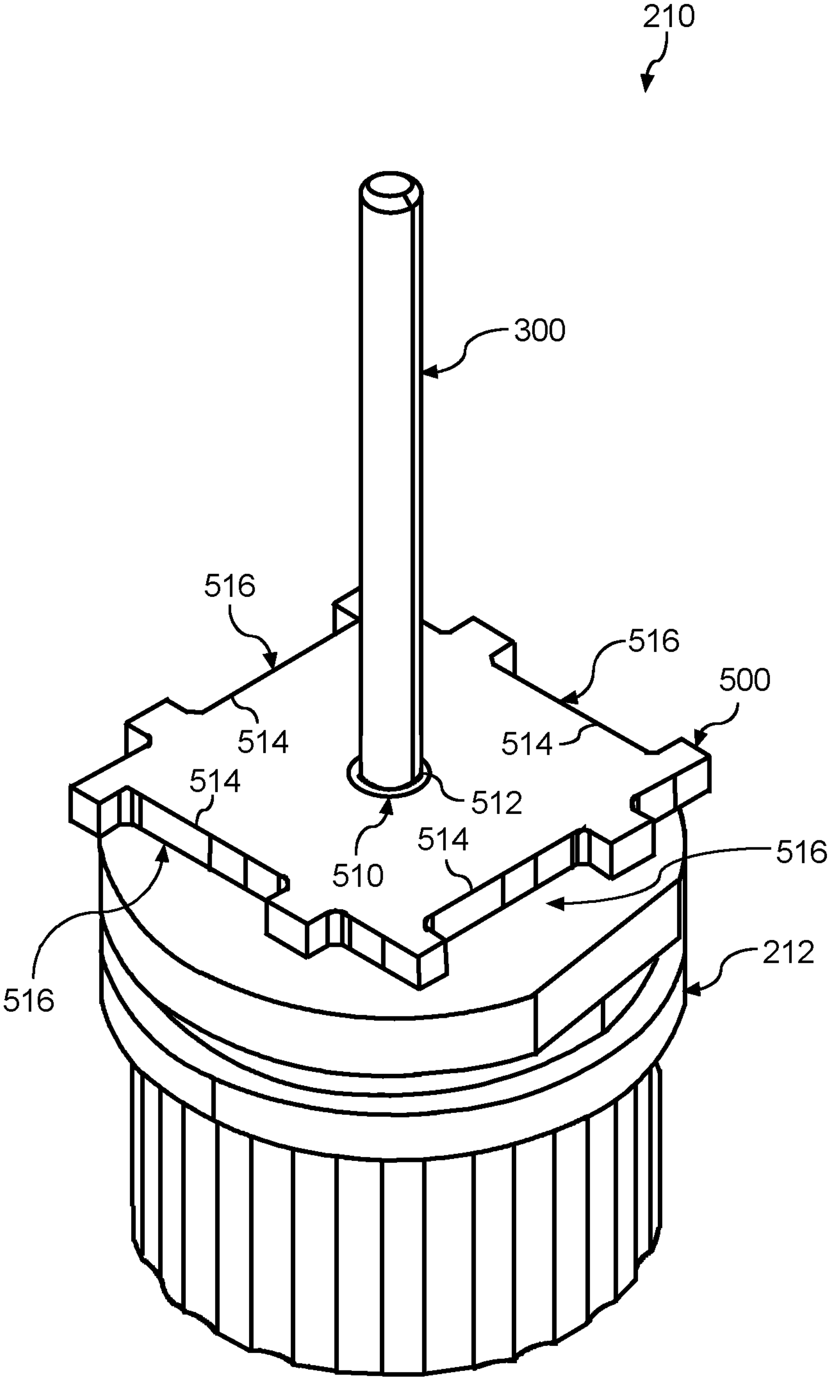
FIG. 6 depicts a perspective view of a circuit board disposed on a lower portion of an antenna assembly according to example embodiments of the present disclosure.
Figure 7:
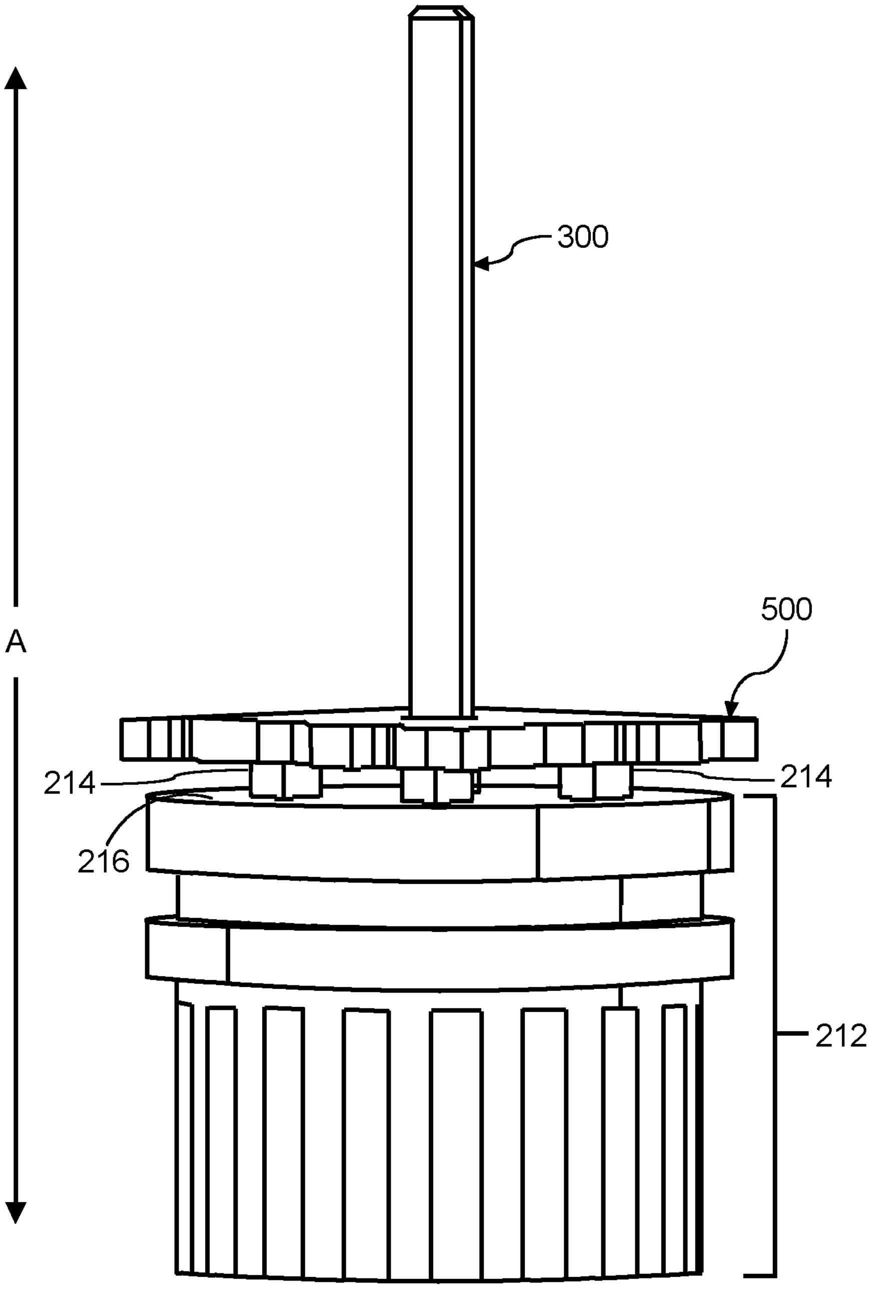
FIG. 7 depicts a side view of a circuit board disposed on a lower portion of an antenna assembly according to example embodiments of the present disclosure.

Referring now to FIGS. 6 and 7, a circuit board 500 can be disposed on the lower portion 210 of the antenna assembly 200 (FIG. 2). As shown, the circuit board 500 can be positioned on the plurality of projections 214 extending from the surface 216 of the base 212. In this manner, the circuit board 500 can be spaced apart from the surface 216 of the base 212 along an axial direction A. As shown, the circuit board 500 can define an aperture 510 configured to accommodate the monopole antenna 300. In some implementations, the aperture 510 can be lined with a conductive material 512. In some implementations, the conductive material 512 can include copper. It should be understood, however, that the aperture 510 defined by the circuit board 500 can be lined with any suitable conductive material 512. As shown, each edge 514 of the circuit board 500 can define a slot 516. As will be discussed below in more detail, the slot 516 can be configured to engage a corresponding structure (e.g., antenna plate) of the circularly polarized antenna 400 (FIG. 1.).

Figure 8:
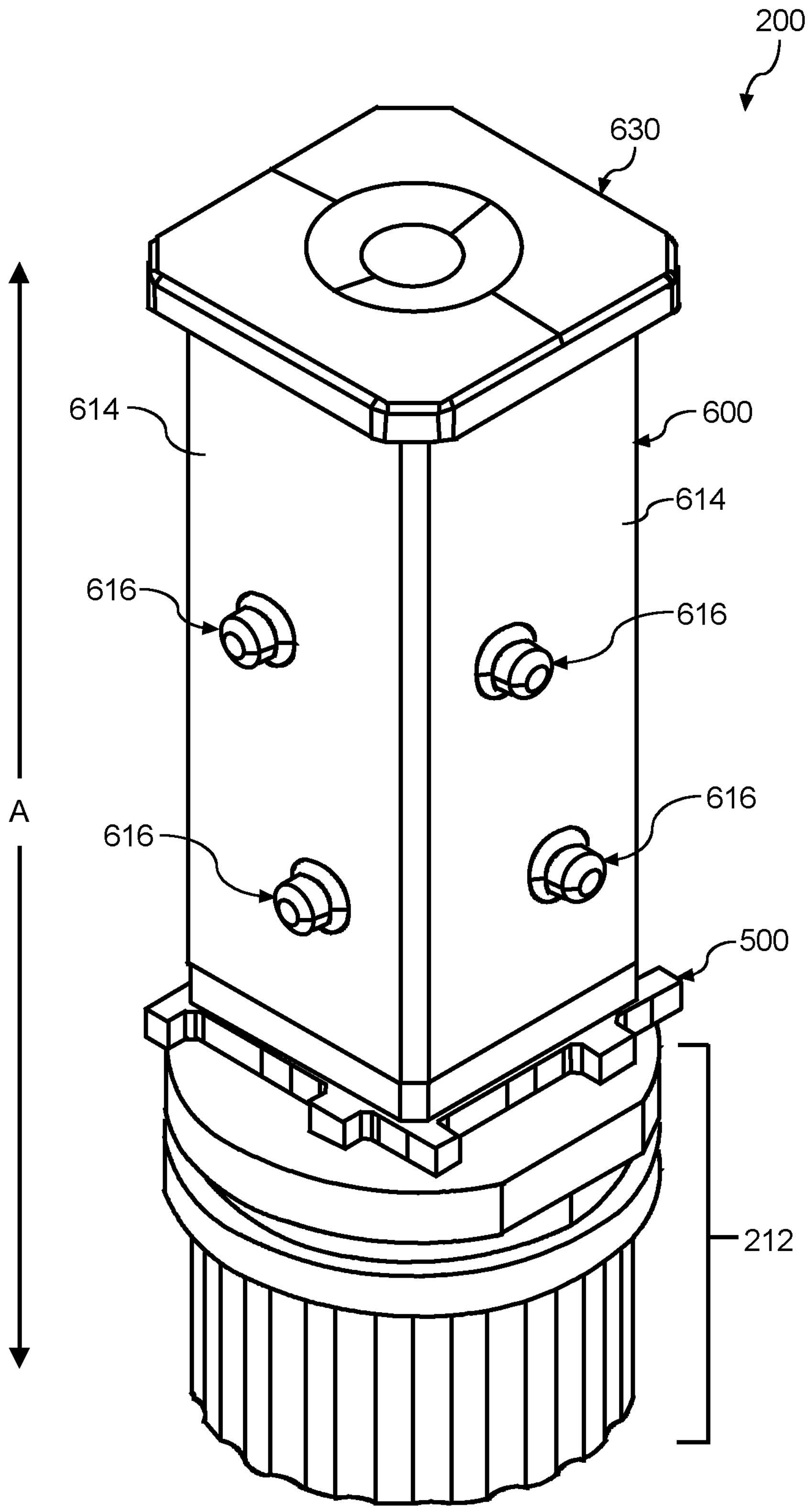
FIG. 8 depicts a perspective view of a column substrate of an upper portion of an antenna assembly coupled to a lower portion of the antenna assembly via a circuit board according to example embodiments of the present disclosure.
Figure 9:
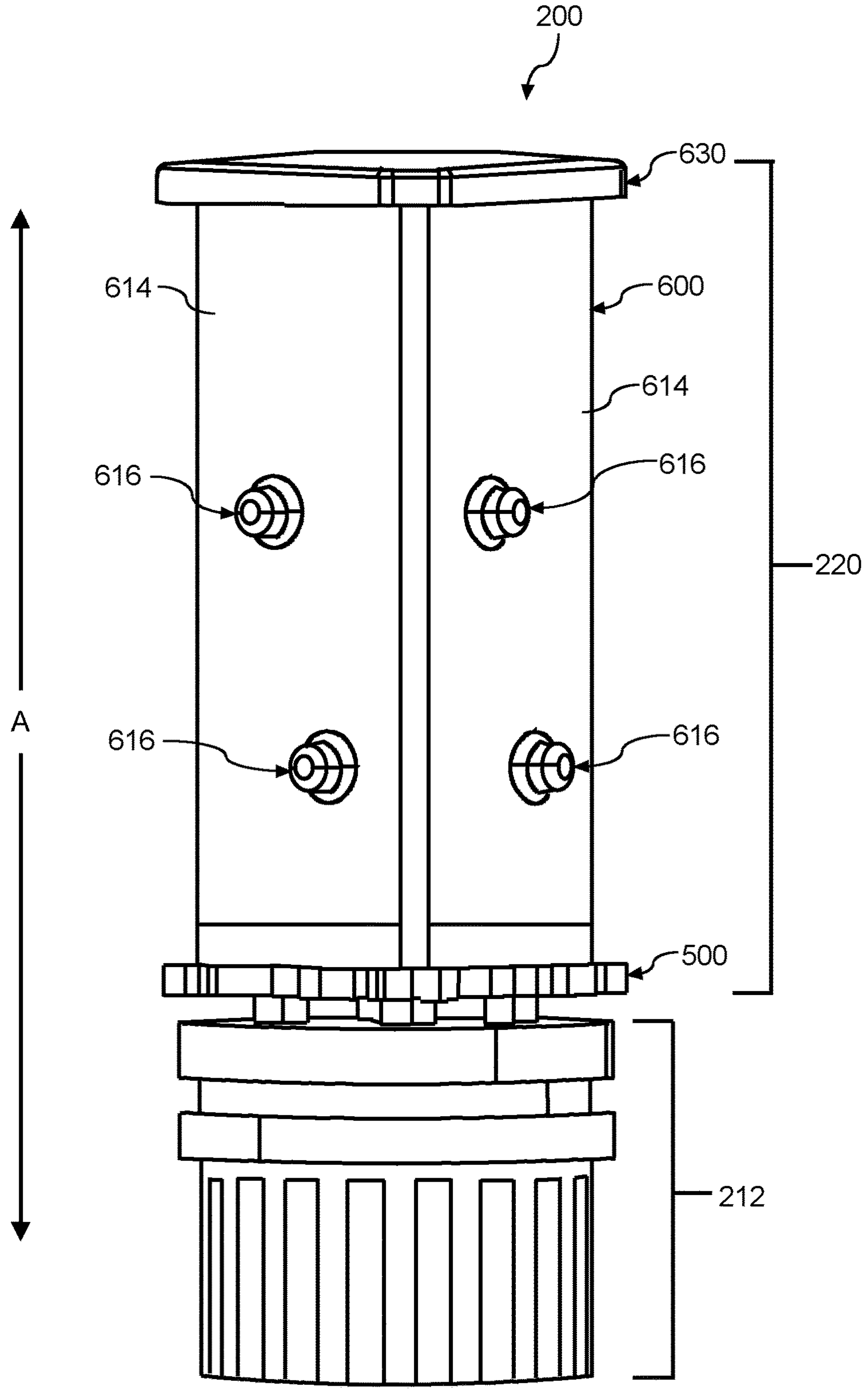
FIG. 9 depicts a side view of a column substrate of an upper portion of an antenna assembly coupled to a lower portion of the antenna assembly via a circuit board according to example embodiments of the present disclosure.
Figure 10:
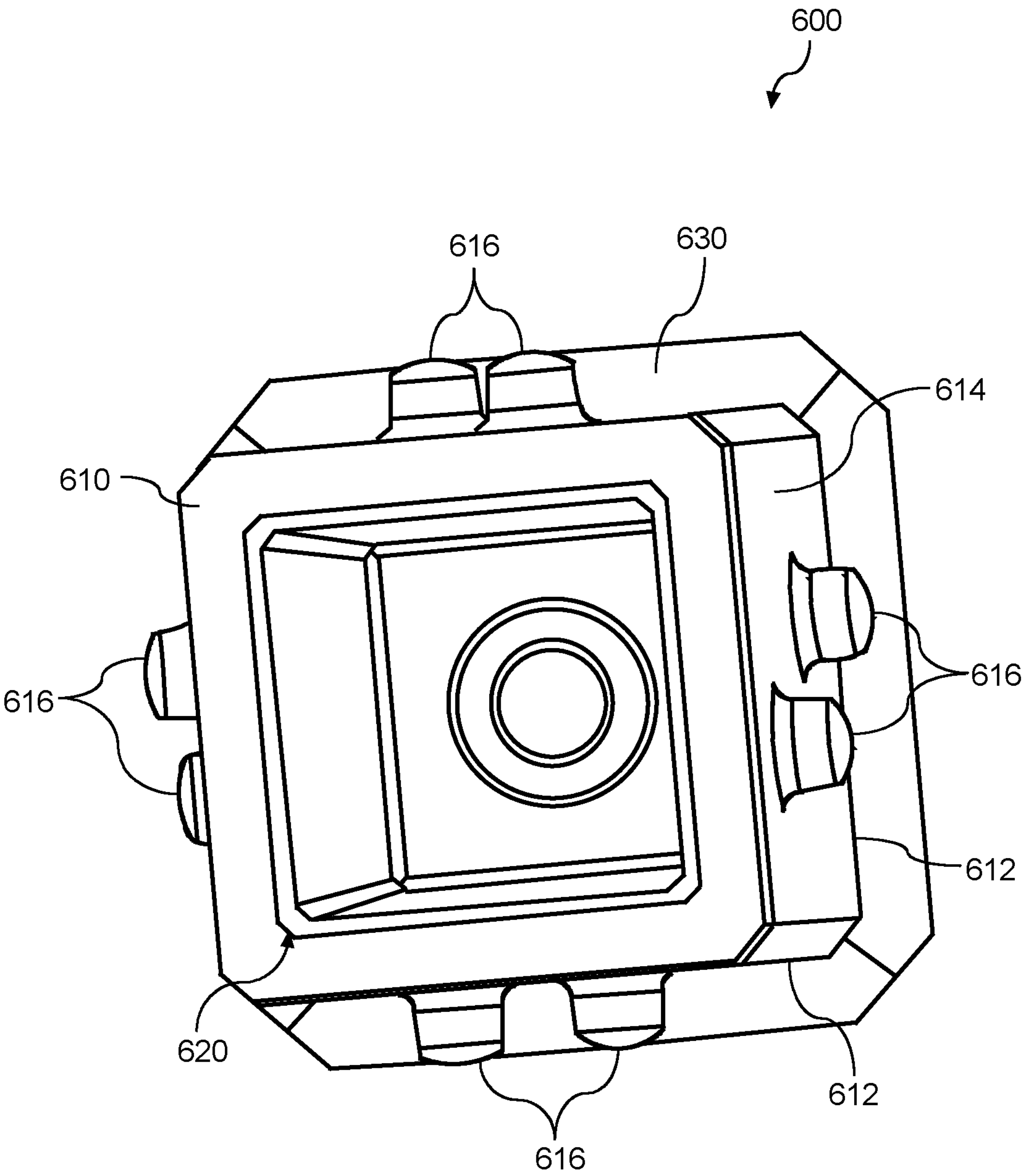
FIG. 10 depicts a bottom view of a column substrate of an upper portion of an antenna assembly according to example embodiments of the present disclosure.

Referring now to FIGS. 8 through 10, the second portion 220 of the antenna assembly 200 can include a column substrate 600. As shown, the column substrate 600 can be disposed on the circuit board 500. Furthermore, the column substrate 600 can extend along the axial direction A between a first end 610 and a second end 612. As shown, the column substrate 600 can include a plurality of sides 614 extending between the first end 610 of the column substrate 600 and the second end 612 of the column substrate 600. For instance, the column substrate 600 can include four sides 614 (e.g., a first side, a second side, a third side, and a fourth side). In alternative implementations, the column substrate 600 can include more or fewer sides 614. As shown, each side 614 of the column substrate 600 can include one or more projections 616. The one or more projections 616 can facilitate coupling isolated magnetic dipole elements 410 (FIG. 1) of the circularly polarized antenna 400 (FIG. 1) to the column substrate 600.

As shown, the column substrate 600 can defined a cavity 620 that extends between the first end 610 of the column substrate 600 and the second end 612 of the column substrate 600 along the axial direction A. In this manner, the monopole antenna 300 (FIG. 3) that is part of the lower portion 210 (FIG. 3) of the antenna assembly 200 can be positioned within the cavity 620 defined by the column substrate 600 when the column substrate 600 is disposed on the circuit board 500.

In some implementations, the second portion 220 of the antenna assembly 200 can include a cover 630. As shown, the cover 630 can be coupled to the second end 612 of the column substrate 600. In this manner, the cavity 620 defined by the column substrate 600 can be enclosed via the circuit board 500 and the cover 630. In some implementations, the cover 630 can be integrally formed with the column substrate 600. In alternative implementations, the cover 630 can be removably coupled to the column substrate 600. In this manner, the cover 630 can be removed from the column substrate 600 to allow a user access to the cavity 620 defined by the column substrate 600.

Figure 11:
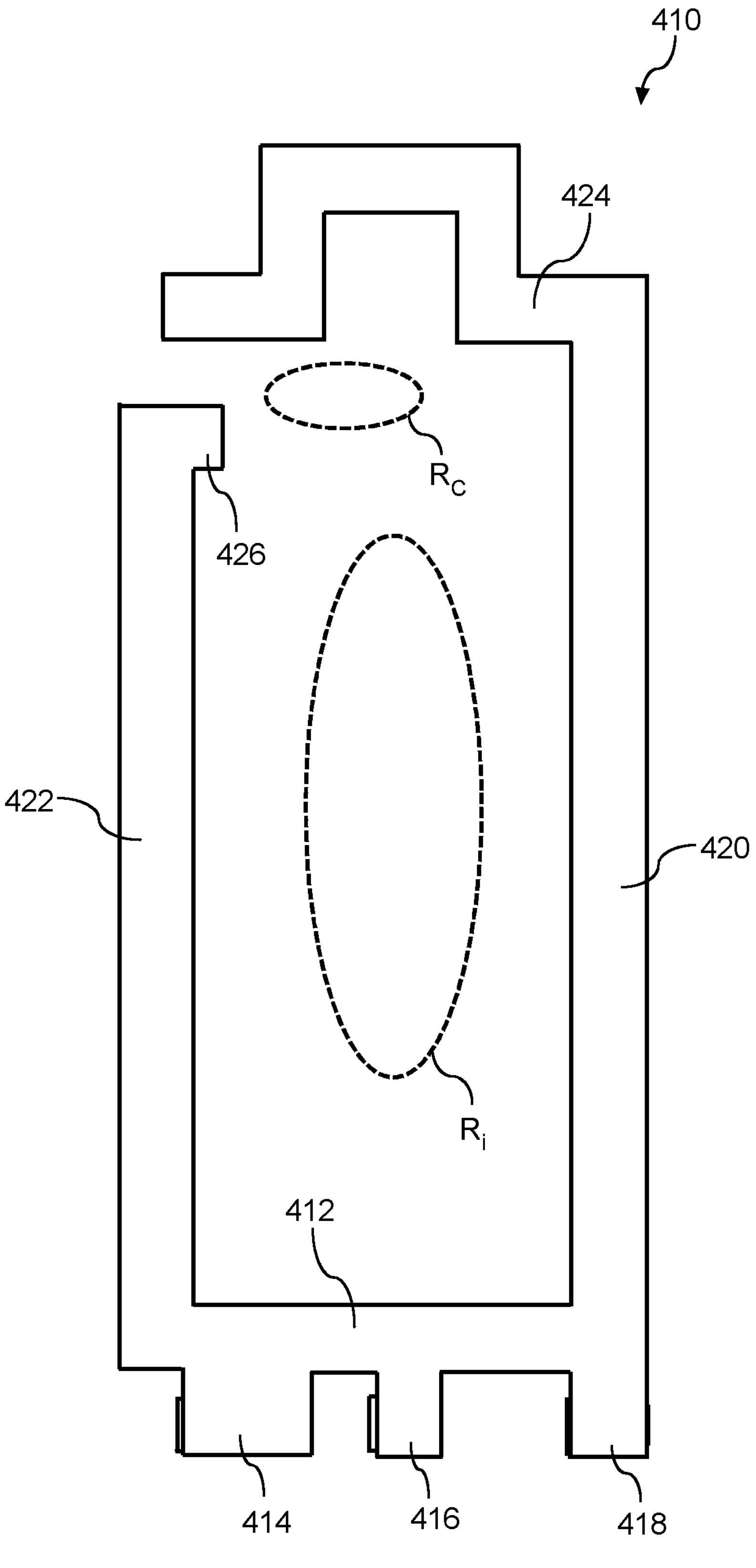
FIG. 11 depicts an isolated magnetic dipole element of a circularly polarized antenna of an antenna assembly according to example embodiments of the present disclosure.

Referring now to FIG. 11, one of the isolated magnetic dipole elements 410 of the circularly polarized antenna 400 (FIG. 1) is provided according to example embodiments of the present disclosure. As shown, the isolated magnetic dipole element 410 can include a bent conductor. The bent conductor can include a bottom portion 412. The bottom portion 412 can include a terminal connection 414 that can be coupled to a corresponding phase shifter 122 (FIG. 1) of the RF phase shifter circuit 120 (FIG. 1). In addition, the bottom portion 412 of the bent conductor can include one or more ground connections 416, 418. The bent conductor can include a pair of vertical portions extending from opposing ends of the bottom portion 412. For instance, the bent conductor can include a first vertical portion 420 extending from a first end of the bottom portion 412 and a second vertical portion 422 extending from a second end of the bottom portion 412. The bent conductor can further include a first horizontal portion 424 and a second horizontal portion 426. The first horizontal portion 424 can extend from a distal end (e.g. farthest from bottom portion 402) of the first vertical portion 420. The second horizontal portion 426 can extend from a distal end of the second vertical portion 422. As shown, the first horizontal portion 424 and the second horizontal portion 426 can overlap with one another to form a capacitive region Rc therebetween. In addition, the bottom portion 412, first vertical portion 420, second vertical portion 422, first horizontal portion 424, and second horizontal portion 426 can collectively form a loop about which an inductive region R, is formed.

It should be understood that each of the plurality of isolated magnetic dipole elements 410 can be coupled to a different side 614 (FIGS. 8 and 9) of the column substrate 600. Furthermore, each of the plurality of isolated magnetic dipole elements 410 can be coupled to a corresponding phase shifter 122 (FIG. 1) of the RF phase shifter circuit 120. For instance, in some implementations, the RF phase shifter circuit 120 can be disposed on the circuit board 500 (FIG. 5). In alternative implementations, the RF phase shifter circuit 120 can be separate from the antenna assembly 200 (FIG. 1).

It should be understood that the RF phase shifter circuit 120 (FIG. 1) can provide a first RF signal to the isolated magnetic dipole element 410 disposed on a first side of the column substrate 600, a second RF signal to the isolated magnetic dipole element 410 disposed on a second side of the column substrate 600, a third RF signal to the isolated magnetic dipole element 410 disposed on a third side of the column substrate 600, and a fourth RF signal disposed on a fourth side of the column substrate 600. In some implementations, the second RF signal can be about 90 degrees out-of-phase relative to the first RF signal. The third RF signal can be about 180 degrees out-of-phase relative to the first RF signal. The fourth RF signal can be about 270 degrees out-of-phase relative to the first RF signal.

Figure 12:
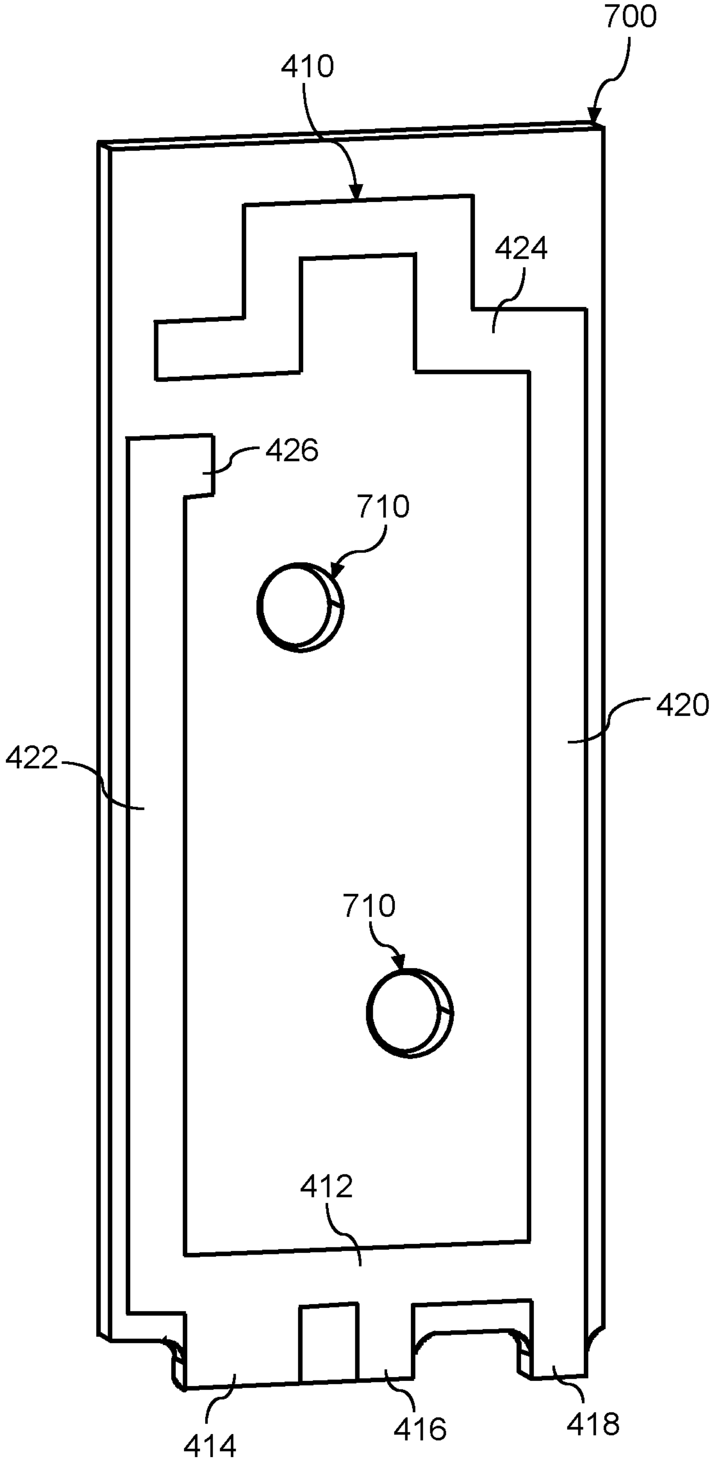
FIG. 12 depicts the isolated magnetic dipole element of FIG. 11 disposed on an antenna plate according to example embodiments of the present disclosure.

Referring now to FIG. 12, each of the isolated magnetic dipole elements 410 (only one shown) can be coupled to a corresponding side 314 (FIG. 8) of the column substrate 600 (FIG. 8) via an antenna plate 700 according to example embodiments of the present disclosure. As shown, the antenna plate 700 can define a plurality of apertures 710. Each of the apertures 710 can be configured to accommodate a corresponding projection of the projections 616 (FIG. 8) extending from each of the sides 614 of the column substrate 600.

For instance, in some implementations, a first isolated magnetic dipole element 410 can be coupled to a first side of the column substrate 600 (FIG. 8) via a first antenna plate 700. A second isolated magnetic dipole element 410 can be coupled to a second side of the column substrate 600 via a second antenna plate 700. A third isolated magnetic dipole element 410 can be coupled to a third side of the column substrate 600 via a third antenna plate 700. A fourth isolated magnetic dipole element 410 can be coupled to a fourth side of the column substrate 600 via a fourth antenna plate 700. In this manner, each of the isolated magnetic dipole elements 410 of the circularly polarized antenna 400 can be coupled to the column substrate 600. It should be understood that each of the antenna plates 700 can engage the slot 516 (FIG. 6) defined by the corresponding edge 514 (FIG. 6) of the circuit board 500 (FIG. 6).

Figure 13:
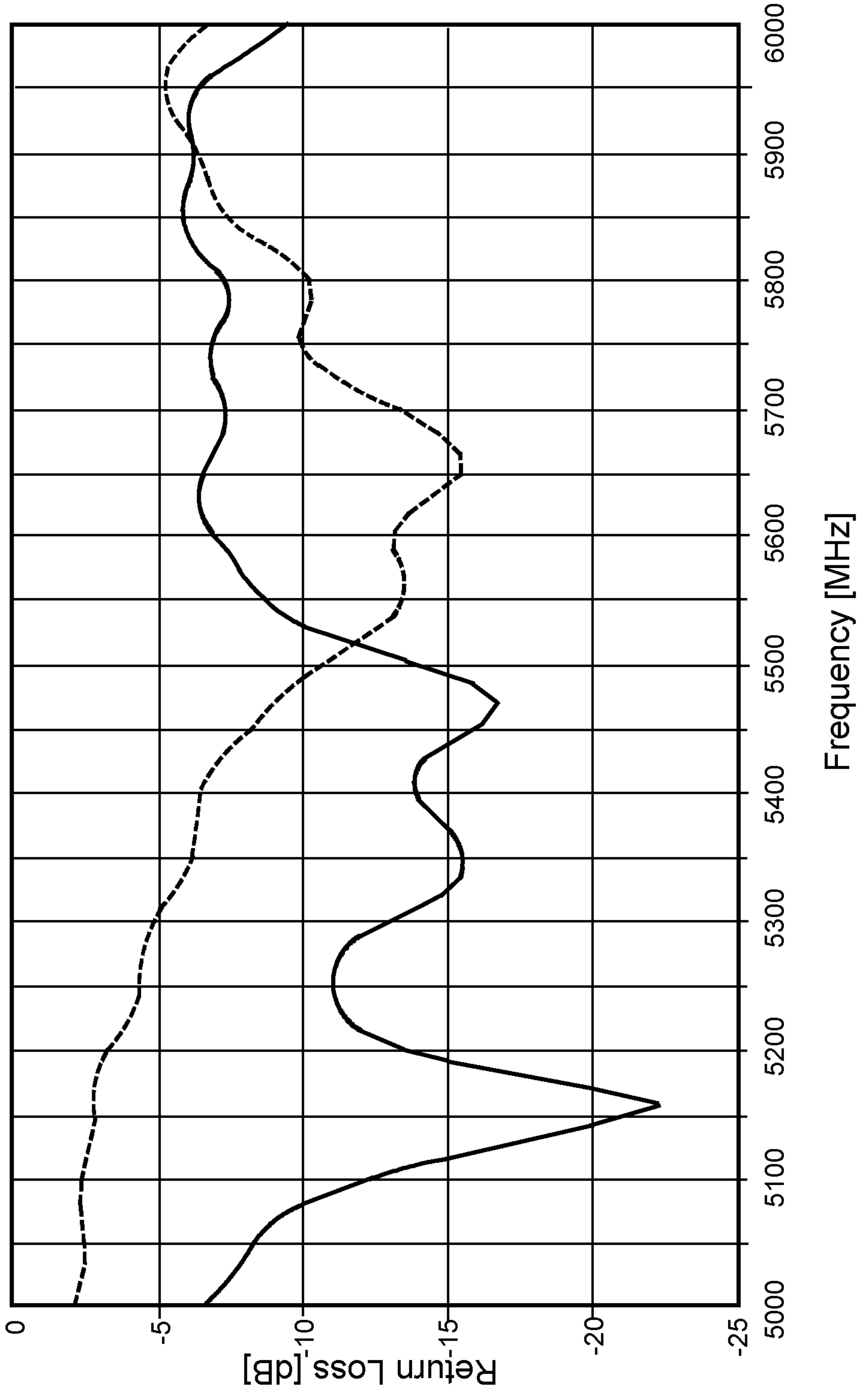
FIG. 13 depicts a graphical illustration of a frequency response associated with a monopole antenna of an antenna assembly according to example embodiments of the present disclosure.

Referring now to FIG. 13, a graphical illustration of return loss associated with a monopole antenna of an antenna assembly is provided according to example embodiments of the present disclosure. As shown, the graphs illustrate return loss (denoted along the vertical axis in decibels) associated with the monopole antenna as a function of frequency (denoted along the horizontal axis in megahertz). More specifically, the graphs illustrate return loss of the monopole antenna over a frequency band that ranges from about 5150 Megahertz to about 5870 Megahertz.

Figure 14:
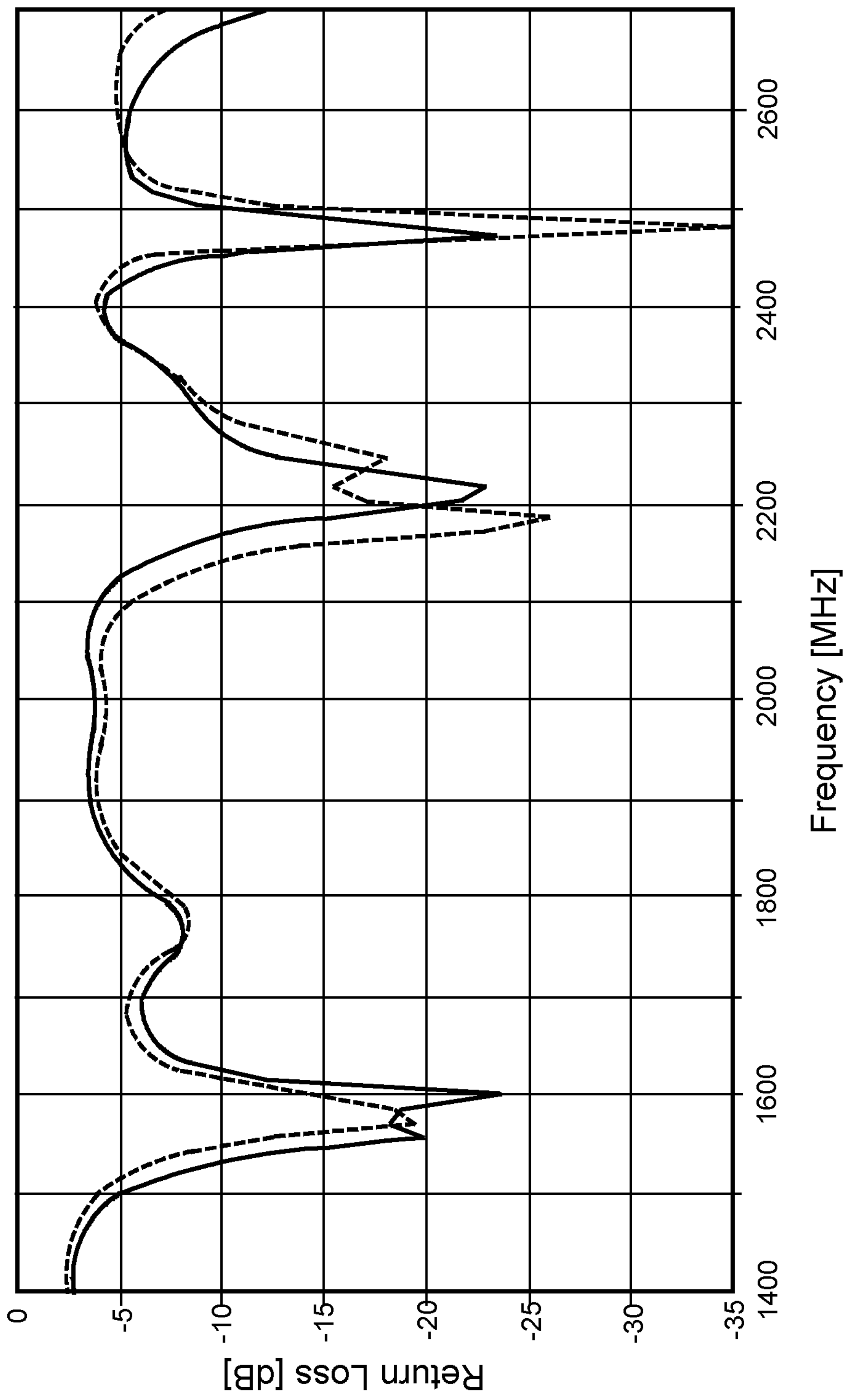
FIG. 14 depicts a graphical illustration of a frequency response associated with a circularly polarized antenna of an antenna assembly according to example embodiments of the present disclosure.

Referring now to FIG. 14, a graphical illustration of return loss associated with a circularly polarized antenna of an antenna assembly is provided according to example embodiments of the present disclosure. As shown, the graphs illustrate return loss (denoted along the vertical axis in decibels) associated with the monopole antenna as a function of frequency (denoted along the horizontal axis in megahertz). More specifically, the graphs illustrate return loss of the monopole antenna over a first frequency band that ranges from about 1560 Megahertz to about 1620 Megahertz and a second frequency band that ranges from about 2400 Megahertz to about 2500 Megahertz.

Figure 15:
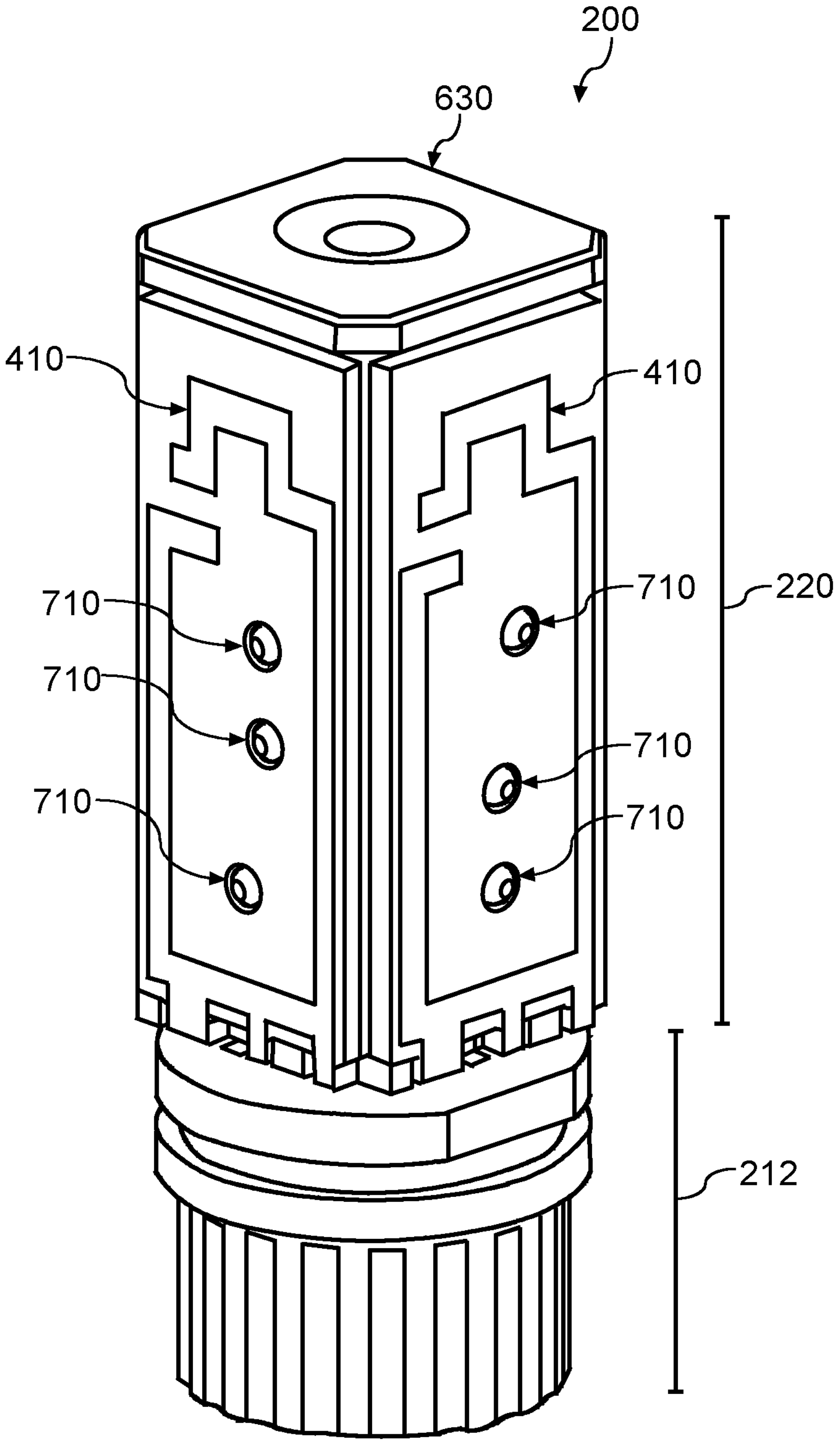
FIG. 15 depicts a perspective view of an antenna assembly according to example embodiments of the present disclosure.
Figure 16:
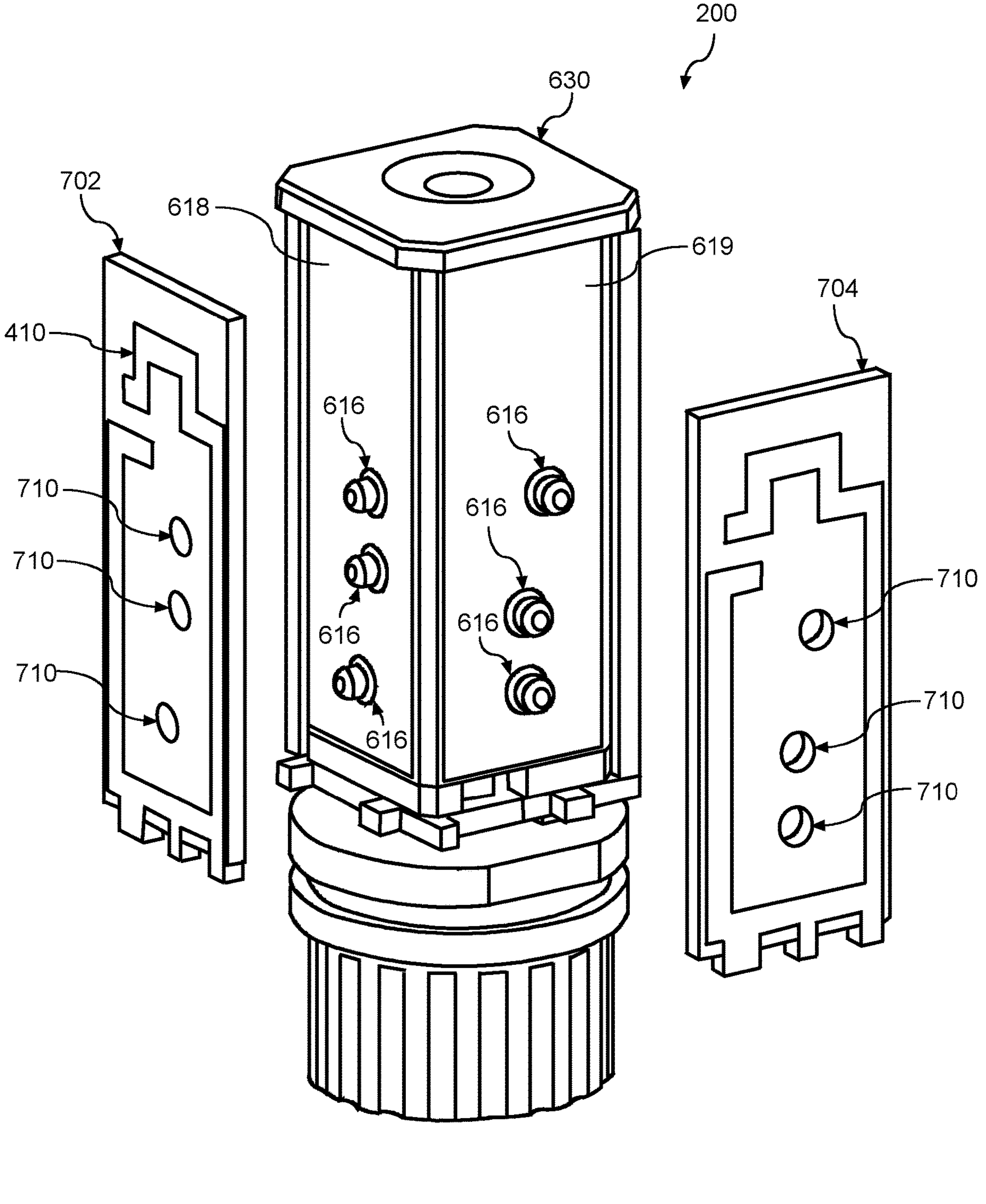
FIG. 16 depicts a perspective view of the antenna assembly of FIG. 15 with antenna plates removed from the column substrate according to example embodiments of the present disclosure.

Referring now to FIGS. 15 and 16, the plurality of projections 616 can, in some implementations, be arranged in a unique pattern to accommodate different types of antenna plates. For instance, the plurality of projections 616 extending from a first side 618 of the column substrate 600 can be arranged in a first pattern that is unique to a first antenna plate 702. More particularly, the first pattern can correspond to the arrangement of apertures 710 defined by the first antenna plate 702. In this manner, the first antenna plate 702 can be coupled to the first side 618 of the column substrate 600.

Furthermore, the plurality of projections 616 extending from a second side 619 of the column substrate 600 can be arranged in a second pattern that is unique to a second antenna plate 704. More particularly, the second pattern can be different than the first pattern and can correspond to the arrangement of apertures 710 defined by the second antenna plate 704. In this manner, the second antenna plate 704 can be coupled to the second side 619 of the column substrate 600.

In some implementations, the projections 616 can be arranged in a different pattern on each side of the column substrate 600. In this manner, the column substrate 600 can be used with different antenna plates. It should be understood that, in alternative implementations, the projections 616 extending from the first side 618 of the column substrate 600 and the projections 616 extending from the second side 619 of the column substrate 600 can be arranged according to the first pattern, whereas the projections 616 extending from a third side of the column substrate 600 and the projections 616 extending from a fourth side of the column substrate 600 can be arranged according to the second pattern. In such implementations, the first antenna plate 702 can be coupled to the first side 618 of the column substrate 600 and the second side 619 of the column substrate 600. Conversely, the second antenna plate 704 can be coupled to the third side of the column substrate 600 and the fourth side of the column substrate 600.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna assembly comprising:
a substrate having a plurality of sides, the substrate defining a cavity;
a first antenna disposed within the cavity; and
a second antenna comprising a plurality of isolated magnetic dipole elements, each of the plurality of isolated magnetic dipole elements is disposed only on a different respective side of the plurality of sides of the substrate.

2. The antenna assembly of claim 1, wherein:
the first antenna is configured to communicate over a first frequency band in a range of about 5000 Megahertz to about 5900 Megahertz; and
the second antenna is configured to communicate over a second frequency band in a range of about 1560 Megahertz to about 1620 Megahertz and a third frequency band in a range of about 2400 Megahertz to about 2500 Megahertz.

3. The antenna assembly of claim 1, wherein:
the first antenna includes a monopole antenna; and
the second antenna includes a circularly polarized antenna.

4. The antenna assembly of claim 3, wherein a radiation pattern associated with the circularly polarized antenna is left-hand circularly polarized or right-band circularly polarized.

5. The antenna assembly of claim 1, further comprising:
a base coupled to the substrate; and
a circuit board coupled to the base, the circuit board defining a plurality of slots.

6. The antenna assembly of claim 5, wherein the first antenna extends through an aperture defined by the circuit board.

7. The antenna assembly of claim 6, wherein the aperture defined by the circuit board is lined with a conductive material.

8. The antenna assembly of claim 5, further comprising:
a cover coupled to the substrate.

9. The antenna assembly of claim 5, further comprising:
a plurality of plates, each of the plurality of plates coupling a corresponding isolated magnetic dipole element of the plurality of isolated magnetic dipole elements to the respective side of the plurality of sides of the substrate, each of the plurality of plates configured to engage a corresponding slot of the plurality of slots.

10. The antenna assembly of claim 9, wherein the plurality of isolated magnetic dipole elements comprise:
a first isolated magnetic dipole element coupled to a first side of the plurality of sides of the substrate via a first plate of the plurality of plates;
a second isolated magnetic dipole element coupled to a second side of the plurality of sides of the substrate via a second plate of the plurality of plates;
a third isolated magnetic dipole element coupled to a third side of the plurality of sides of the substrate via a third plate of the plurality of plates; and
a fourth isolated magnetic dipole element coupled to a fourth side of the plurality of sides of the substrate via a fourth plate of the plurality of plates.

11. The antenna assembly of claim 10, wherein:
a first side of the plurality of sides of the substrate includes a plurality of projections arranged in a first pattern, the first pattern being unique to a first plate of the plurality of plates; and
a second side of the plurality of sides of the substrate includes a plurality of projections arranged in a second pattern, the second pattern being unique to a second plate of the plurality of plates.

12. The antenna assembly of claim 9, wherein:
the substrate includes one or more projections extending from each of the plurality of sides; and
each of the plurality of plates defines one or more apertures configured to accommodate the one or more projections.

13. An antenna system comprising:
a phase shifter circuit comprising a plurality of phase shifters, each of the plurality of phase shifters electrically coupled to a radio frequency source; and
an antenna assembly comprising:
a substrate having a plurality of sides, the substrate defining a cavity;
a first antenna disposed within the cavity; and
a second antenna comprising a plurality of isolated magnetic dipole elements, each of the plurality of isolated magnetic dipole elements is disposed only on a different respective side of the plurality of sides of the substrate.

14. The antenna system of claim 13, wherein:
the first antenna includes a monopole antenna; and
the second antenna includes a circularly polarized antenna.

15. The antenna system of claim 14, wherein a radiation pattern associated with the circularly polarized antenna is left-hand circularly polarized or right-hand circularly polarized.

16. The antenna system of claim 13, further comprising:
a base coupled to the substrate; and
a circuit board coupled to the base, the circuit board defining a plurality of slots.

17. The antenna system of claim 16, wherein the first antenna extends through an aperture defined by the circuit board.

18. The antenna system of claim 17, wherein the base comprises an electrical connector configured to electrically couple the first antenna to the radio frequency source.

19. The antenna system of claim 16, further comprising:
a plurality of plates, each of the plurality of plates coupling a corresponding isolated magnetic dipole element of the plurality of isolated magnetic dipole elements to a different side of the plurality of sides of the substrate, each of the plurality of plates comprising a projection configured to engage a corresponding slot of the plurality of slots.

20. The antenna system of claim 19, wherein:
the substrate includes one or more projections extending from each of the plurality of sides; and
each of the plurality of plates defines one or more apertures configured to accommodate the one or more projections.

* * * * *